United States Patent [19]

Stenner et al.

[11] 4,147,272
[45] Apr. 3, 1979

[54] PRESSURE RELIEF DEVICE

[75] Inventors: Irving H. Stenner, Brockport; John M. Nelson, Rochester, both of N.Y.

[73] Assignee: Bernzomatic Corporation, Medina, N.Y.

[21] Appl. No.: 794,574

[22] Filed: May 6, 1977

[51] Int. Cl.² .................. B65D 25/00; F16K 17/14
[52] U.S. Cl. ................. 220/89 B; 137/72; 222/397; 431/344
[58] Field of Search ............ 220/89 B; 137/72; 222/397; 431/344

[56] References Cited

U.S. PATENT DOCUMENTS

| | | | |
|---|---|---|---|
| 1,973,182 | 9/1934 | Shaw | 220/89 B |
| 2,793,504 | 5/1957 | Webster | 431/344 |
| 2,825,325 | 3/1958 | Ross | 431/344 |
| 3,064,740 | 11/1962 | Knapp | 220/89 B |
| 3,181,589 | 5/1965 | Phelps | 431/344 |
| 3,357,601 | 12/1967 | Crawford et al. | 222/397 |
| 3,362,063 | 1/1968 | Williams | 220/89 B |
| 3,388,962 | 6/1968 | Baumann et al. | 431/344 |
| 3,515,308 | 6/1970 | Hayes et al. | 220/89 A |
| 3,574,506 | 4/1971 | Locke | 431/344 |

Primary Examiner—William Price
Assistant Examiner—Allan N. Shoap
Attorney, Agent, or Firm—Sprung, Felfe, Horn, Lynch & Kramer

[57] ABSTRACT

A pressure relief device for a high pressure gas cylinder of the type that is usable for oxy-fuel torches. The device comprises an aperture in the wall of the cylinder and a eutectic solder filling the aperture. The aperture and plug are also positionable in a substantially planar wall portion that is depressed below the surrounding cylinder wall to protect the plug from dropped objects or inadvertent poking and scraping by the user.

7 Claims, 2 Drawing Figures

PRESSURE RELIEF DEVICE

BACKGROUND OF THE INVENTION

The present invention relates to a pressure relief device for a high pressure gas cylinder.

Pressure relief devices are known in the prior art, but these known devices are complex in nature and are contemplated for re-use and are therefore too expensive to construct and to mount if they are desired to be used with a single use or disposable cylinder.

In U.S. Pat. No. 1,969,724, solder is used to merely seal a filled can rather than to form a pressure relief device since the can is not a high pressure gas container. In U.S. Pat. No. 2,580,340, a complex pressure relief device is shown wherein the solder plug is not in direct contact wih the wall of the pressure cooker but rather has a rubber seal therearound.

In U.S. Pat. No. 3,669,302, a plastic disk is mounted within the wall of a capacitor cover and thus is not suitable for high pressure applications since it is intended to melt before any gas pressure is created. Additionally, mounting a disk into the wall of a high pressure cylinder would be a costly and complex procedure.

U.S. Pat. Nos. 2,269,092 and 2,673,010 teach the use of fusible plugs in pressure containers or tanks, but these plugs have a complex construction and are of the aforementioned type wherein multiple uses of the container are contemplated. Neither of these devices teach a fusible plug with a simple construction which is suitable for single use or disposable gas cylinders.

SUMMARY OF THE INVENTION

The present invention provides a simple and low cost pressure relief device which eliminates the disadvantages of these known in the prior art.

This is achieved by the present invention which comprises at least one pressure relief means in a high pressure gas cylinder. Each pressure relief means comprises means defining at least one aperture in the wall of the cylinder and a eutectic solder filling each aperture. Each aperture has a diameter of about 0.015 to 0.100 inches and preferably about 0.030 to 0.035 inches. The pressure relief means is preferably disposed on the dome portion of the cylinder.

The pressure relief means may also comprise a depression in the wall of the cylinder having a substantially planar wall portion in which each aperture and plug is located. The planar wall portion is preferably depressed at least about 0.02 inches from the surrounding cylinder wall and has a maximum diameter of about 0.18 inches.

DETAILED DESCRIPTION OF THE PREFERRED EMBODIMENTS

Figure 1:
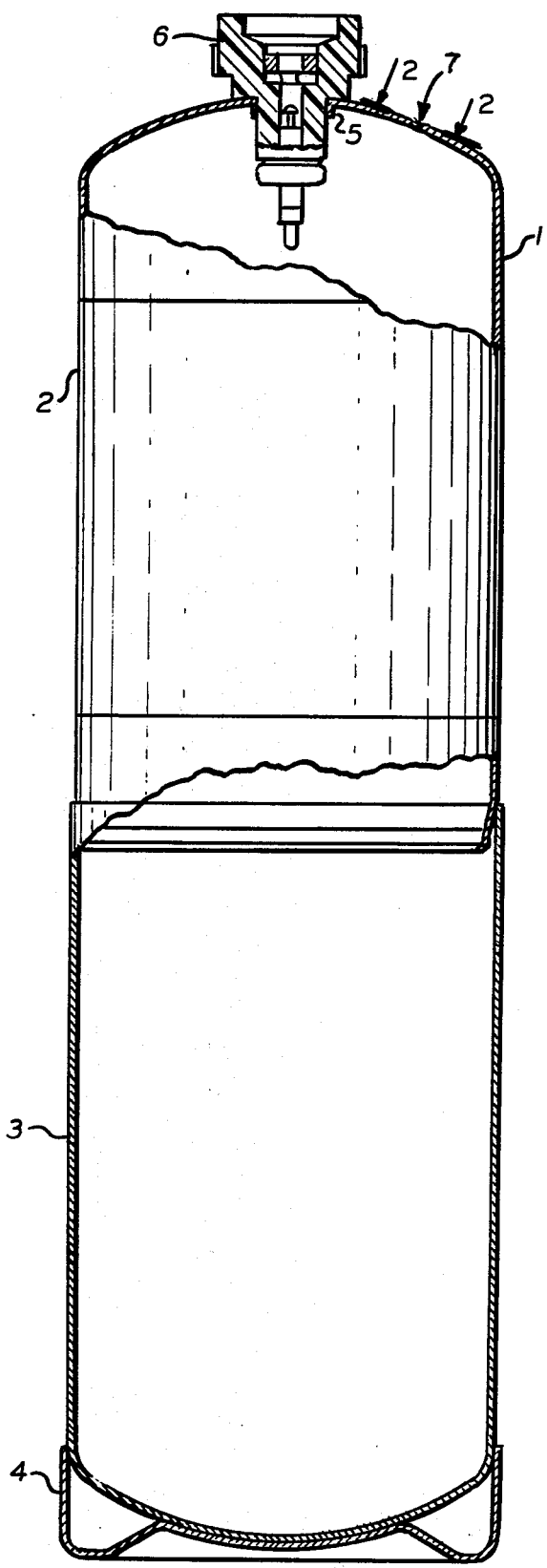
FIG. 1 is a cross-section view of the cylinder with the pressure relief device of the present invention.
Figure 2:
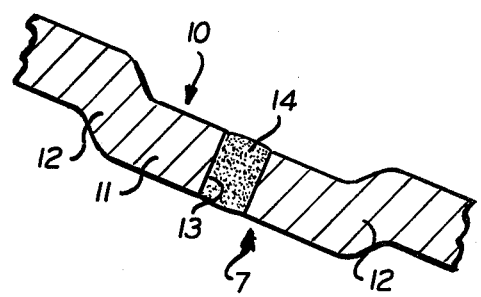
FIG. 2 is an expanded cross-sectional view along lines 2—2 of FIG. 1.

Referring to FIGS. 1 and 2, the high pressure gas cylinder 1 includes upper portion 2 and lower portion 3 sealingly connected thereto. At the bottom of the lower portion 3 is connected base portion 4 which permits the cylinder to stand by itself on a given plane.

Upper cylinder portion 2 includes a neck or dome-shaped end portion 5 having a valve 6 disposed therein for removing the gas contents of the cylinder which may be oxygen under high pressure when the cylinder is used in an oxy-fuel torch such as an oxy-propane torch.

The cylinder also includes at least one pressure relief valve means 7 of which one is shown in FIG. 1 and is disposed on neck or dome-shaped end portion 5 of the cylinder 1.

The pressure relief means 7 includes at least one aperture 13 filled by a commercially available eutectic solder material to form solder plug 14 which can be substantially flush with the outer surfaces of the wall of the cylinder. Aperture 13 can be tapered in either direction depending on the relief characteristics desired. Also, the plug 14 can extend and be enlarged on the inside of the cylinder 2.

In a preferred embodiment, the pressure relief means 7 includes a depression 10 in the wall of the cylinder having a substantially planar portion 11 in which aperture 13 and plug 14 are located.

The depression is preferably circular in shape and has a maximum diameter of about 0.18 inches and portion 11 is depressed a minimum of about 0.02 inches from the surrounding cylinder wall. The portions 12 between the portion 11 and the surrounding cylinder wall are disposed from about 0 to 45 degrees with respect to a line perpendicular to the portion 11 of the depression. The depression protects the eutectic plug from objects that come in contact with the cylinder or from scraping and/or poking by the user.

The aperture 13 should have a diameter of about 0.015 to 0.100 inches since if the aperture is too small surface tension will prevent the filling of the aperture. The aperture has a preferable diameter of about 0.030 to 0.035 inches.

The diameter of the hole is determined by the necessity for providing adequate relief characteristics since too small a hole will not allow for proper discharge of the cylinder contents and too large a hole results in mechanical strength problems since it is difficult to maintain a seal under pressure with too large a hole. The size of the hole also depends in part on the different type of solder/fluxes that are employed.

The location of the hole may be radially eccentric with respect to the depression and additionally its axis may be disposed at an angle with respect to the perpendicular of portion 11 of the cylinder wall.

It is also clear from the present invention that the cylinder can comprise more than one pressure relief means and that it can be disposed at any point along the wall thereof. It is also clear that more than one aperture can be disposed within each depression and filled with a eutectic solder plug.

What is claimed is:

1. In a high pressure gas cylinder of the type usable for an oxy-fuel torch and having a valved dome-shaped end portion, wherein the improvement comprises at least one pressure relief means comprising a depression in the wall of the end portion of the cylinder, said depression having a substantially planar portion, means defining at least one aperture in the planar portion of the depression and a eutectic solder filling in each aperture.

2. The cylinder according to claim 1, wherein each aperture has a diameter of about 0.015 to 0.100 inches.

3. The cylinder according to claim 2, wherein each aperture has a diameter of about 0.030 to 0.035.

4. The cylinder according to claim 1, wherein the planar wall portion is depressed at least about 0.02 inches from the surrounding cylinder wall.

5. The cylinder according to claim 4, wherein each depression is circular and has a maximum diameter of about 0.18 inches.

6. The cylinder according to claim 4, wherein each aperture has a diameter of about 0.015 to 0.100 inches.

7. The cylinder according to claim 4, wherein each aperture has a diameter of about 0.030 to 0.035 inches.

* * * * *